United States Patent [19]

Cook et al.

[11] 4,442,802

[45] Apr. 17, 1984

[54] INTERNAL COMBUSTION ENGINE WATER INJECTOR

[76] Inventors: Earl H. Cook, 2 Chaparrel La., Rancho Palos Verdes, Calif. 90274; Norman E. Booth, 7561 Keith Cir., La Palma, Calif. 90623

[21] Appl. No.: 432,181

[22] Filed: Oct. 1, 1982

[51] Int. Cl.$^3$ .................. F02B 47/02; F02D 19/00
[52] U.S. Cl. .................. 123/25 L; 123/25 R; 123/25 A
[58] Field of Search ............... 123/25 R, 25 A, 25 E, 123/25 L, 25 J, 198 A; 261/18 A

[56] References Cited

U.S. PATENT DOCUMENTS

| | | | |
|---|---|---|---|
| 3,716,040 | 2/1973 | Herpin | 123/25 R |
| 4,064,842 | 12/1977 | Sherrill | 123/25 L |
| 4,170,960 | 10/1979 | Germack et al. | 123/25 L |
| 4,336,772 | 6/1982 | Young et al. | 123/25 L |

*Primary Examiner*—Ira S. Lazarus
*Attorney, Agent, or Firm*—William C. Babcock

[57] ABSTRACT

An auxiliary apparatus for injecting water into the intake manifold of an automotive internal combustion engine at an adjustable visible rate that is related to the number of cylinders of the engine to achieve increased mileage from the vehicle and power output from the engine, eliminate pinging and Dieseling, minimize build up of carbon around the valves of the engine, results in the engine operating at a lower temperature, and allows the use of low octane fuel without detrimental results.

1 Claim, 4 Drawing Figures

INTERNAL COMBUSTION ENGINE WATER INJECTOR

DESCRIPTION OF THE PRIOR ART

For many years it has been known that injection of water into an internal combustion engine results in improved power and smoother operation of the engine. However, prior to the present invention there was no water injection of simple structure that could be adjusted to visually indicate the rate of flow of water to the engine, which rate is related to the displacement and number of cylinders of the engine.

A major object of the present invention is to provide a water injector that may be adjusted to vary the rate of flow of water to the engine to permit a high compression engine to operate satisfactorily with low octane fuel, to minimize knocking and pinging of the engine, as well as to eliminate Dieseling.

A further object of the invention is to improve the milage obtained from the vehicle, result in the engine operating at a lower than normal temperature, minimize build up of carbon around the valves, and increase the power output of the engine.

Yet another object of the invention is to supply a water injector of simple design, that requires little or no maintenance, and one that may be easily and quickly installed on a vehicle.

These and other objects and advantages of the invention will become apparent from the following description of a preferred form thereof.

SUMMARY OF THE INVENTION

The water injector of the present invention includes a cylindrical, vertically disposed valve body that has a water inlet in communication with a water reservoir. A plug valve member is rotatably and sealingly supported in the valve body, and regulates the rate at which water may flow from the reservoir downwardly through the valve body. The valve body has a circular recess in the bottom thereof that sealingly engages an upper end of a transparent cylindrical shell. The lower end of the shell sealingly engages a circular recess in the upper surface of a bottom piece.

The valve body, shell and bottom piece are removably held together by a U-shaped clip. When so held they cooperate to define a confined space. The valve body has a first passage therein that by a first tube is connected to the distributor of the vehicle. The bottom piece has a second passage therein that by a second tube is connected to the base of the carburetor on the primary side thereof, which in most instances will be the vacuum advance passage.

When the engine is operating, a vacuum will be formed in the confined space of the water injector due to air being withdrawn therefrom through the second tube. The vacuum created in the confined space causes water to flow from the reservoir to the confined space, with the rate of flow being regulated by rotation of the plug valve member. The plug valve member has a water outlet extending downwardly therefrom into the confined space, from which outlet water flows downwardly as separate drops that are visible through the transparent shell.

The vacuum created in the confined space not only results in the flow of drops of water as above described, but the vacuum due to the connection of the first tube to the distributor results in timing advance in the distributor in conventional manner.

The rate of flow of water into the confined space is regulated for a rate that is appropriate for the particular engine on which the invention has been installed, and this rate being such that when the water droplets enter the combustion chamber they immediately turn to steam under the engine heat and expand to vapor to increase the pressure to which the pistons are subjected. The transformation of water to steam not only increases the pressure in the cylinder, but cools the interior of the cylinder due to the heat required to transform the water to steam. The expansion of water to steam and super heating the latter due to the combustion of the fuel air mixture produces increased engine power and increased gasoline mileage, and also results in a minimum build up of carbon around the valves of the engine. The water injected into the engine cannot harm the latter as the water is dissapated as steam within the combustion chambers, and will only be injected into the engine when the latter is operating.

DESCRIPTION OF THE PREFERRED EMBODIMENT

Figure 4:
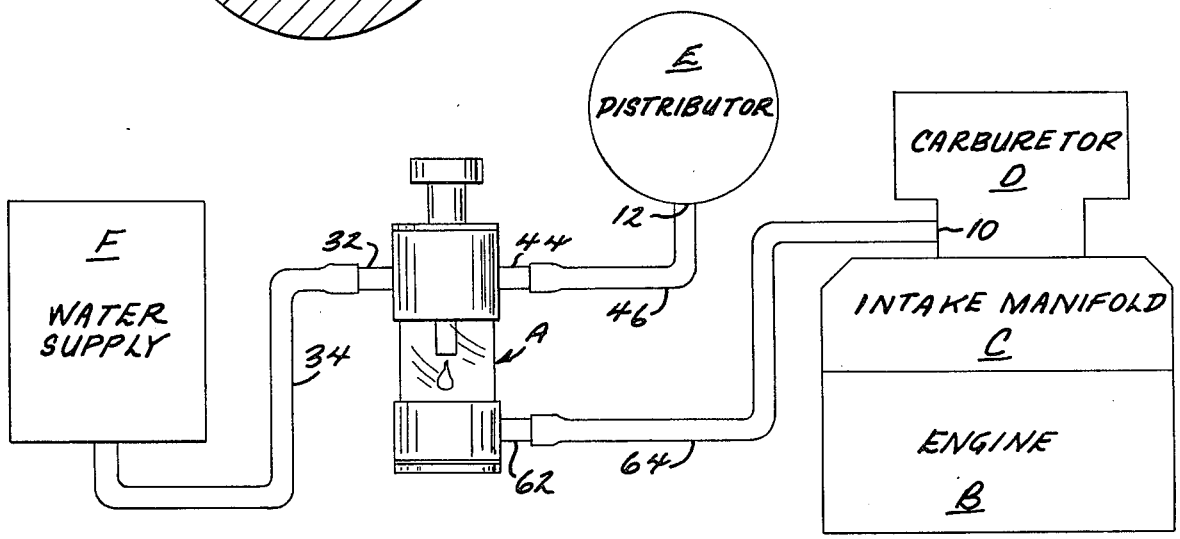
FIG. 4 is a schematic view of how the water injector is operatively associated with the water supply reservoir, distributor, carburetor, intake manifold, and the internal combustion engine.

The water injector of the present invention A is used in conjunction with an automotive internal combustion engine B as shown in FIG. 4, which engine includes an intake manifold C, and a carburetor D that includes a passage 10 that is normally connected by a tube (not shown) to a passage 12 in a distributor E, with the vacuum generated in the passage 10 controlling the spark advance of the distributor. However, when the present invention is used the connection between the passages 10 and 12 is eliminated.

Also, in using the water injector A a water reservoir F is provided which may be a pliable bag or the like. The water injector A includes a vertically disposed cylindrical valve body 14 that has a top surface 16 and a bottom surface 18. A cylindrical bore 20 extends downwardly and longitudinally through the valve body 14. A cylindrical valve member 22 is rotatably positioned in the bore 20, with the valve member having longitudinally spaced grooves 22a and 22b on the exterior surface thereof.

The valve member 22 has a transverse passage 24 therein that intersects a downwardly extending longitudinal passage 26. The grooves 22a and 22b have sealing rings 28a and 28b mounted therein that engage the surface of the valve body 14 defining the bore 20. The sealing rings 28a and 28b are situated above and below the transverse passage 24.

Figure 1:
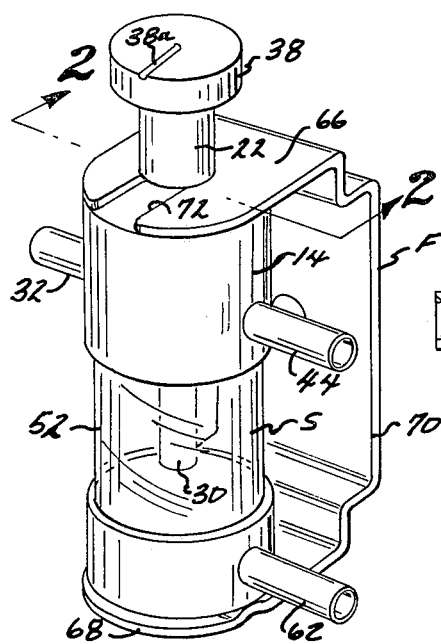
FIG. 1 is a perspective view of the water injector.
Figure 2:
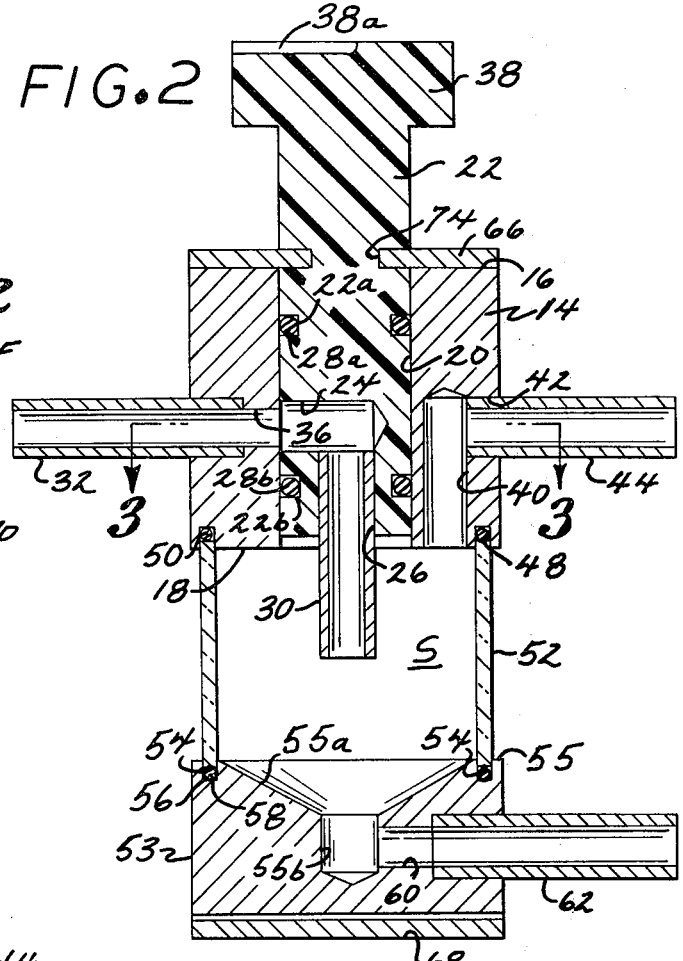
FIG. 2 is a vertical cross sectional view of the injector taken on the line 2—2 of FIG. 1.
Figure 3:
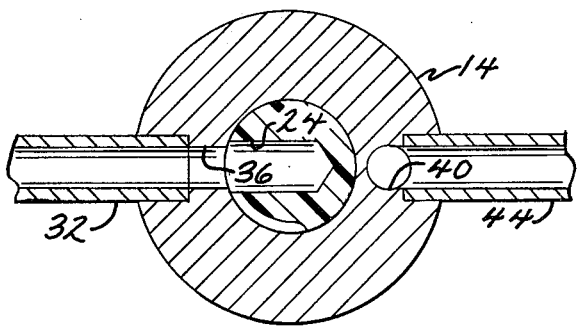
FIG. 3 is a transverse cross sectional view of the injector taken on the line 3—3 of FIG. 2.

In FIG. 2 it will be seen that a tubular member 30 extends downwardly from the valve member 22 and is in communication with the passage 26. A second tubular member 32 extends outwardly from the valve body 14 and by a conduit 34 is connected to the lower portion of the water reservoir F. The tubular member 32 is in communication with a transverse passage 36 formed in the valve body 14 and lies in the same plane as the transverse passage 24.

The valve member 22 extends upwardly above the valve body 14 to terminate in a handle 38. A longitudinal passage 40 extends upwardly in the valve body 14 to intersect the transverse passage 42 from which a tubular member 44 extends outwardly. The tubular member 44 is connected by a flexible tube 46 to the passage 12 in distributor E.

The bottom surface 18 has a circular recess 48 extending upwardly therein in which a resilient sealing ring 50 is disposed. The circular recess 48 is engaged by the upper end of a transparent, rigid, cylindrical shell 52, which shell has a lower end portion 54.

The base 53 includes a top surface 55 that has a circular recess 56 extending downwardly therein in which a resilient sealing ring 58 is disposed. The lower portion 54 of the shell 52 is sealingly mounted in the recess 56 as may be seen in FIG. 2. The top 55 as shown in FIG. 2 on the inner portion develops into a downwardly extending conical surface 55a that at the center develops into a recess 55b that is in communication with a transverse passage 60 that has a tubular member 62 extending outwardly therefrom.

The tubular member 62 is by a pliable tube 64 connected to the passage 10 of carburetor D. A supporting clip F is provided that includes an upper leg 66, lower leg 68 and connecting member 70. The upper and lower legs 66 and 68 are so spaced that they pressure contact top surface 66 and base 53 to maintain the upper and lower ends of cylindrical shell 52 in pressure sealing contact with resilient rings 50 and 58. The upper leg 66 has a recess 74 therein that extends around the upper portion of the valve member 22 and engages a slot 72 formed in the valve member 22. The first leg 66 when it has the slot 72 thereof in engagement with the recess 74 maintains the valve member 22 in a rotatable position, but with the transverse passage 24 being maintained in the same plane as the passage 36 as may be seen in FIG. 2. The supporting clip F may be a screw or other fastening means (not shown) secured at a convenient location relative to the portion of the automotive vehicle (not shown) adjacent the engine B. The handle 38 has a position indicating recess 38a formed in the upper portion thereof.

The valve body 14, shell 52 and base 53 cooperate to define a confined space when held together by the clip F. After the water injector A is installed as shown in FIG. 4 the engine B is operated, and a vacuum is created in the confined space S.

The vacuum causes water to be drawn from reservoir F through tube 34, passages 36 and 24, tube 30 to enter confined space S as individual drops that flow through tube 64, passage 10 to manifold C. The rate the number of drops enter confined space S is dependent on the relationship of passages 24 and 36 relative to one another, but in general the rate will be between 1 and 8 drops per second depending on the displacement and number of cylinders of engine B.

After the water has been drawn into intake manifold C, it will subsequently be vaporized in the combustion zones of the engine B to provide the advantages previously described.

The use and operation of the invention A has been previously described and need not be repeated.

What is claimed is:

1. In combination with an internal combustion engine that has an intake manifold, a carburetor that has a vacuum passage therein, and a distributor that has a vacuum passage therein that controls a spark advance mechanism that forms a part of said distributor, a water injection assembly that includes:

a. a vertically positionable valve body that has a top and a bottom surface and a bore extending therebetween, a first transverse passage in said valve body, a first tubular member extending outwardly from said valve body in communication with said first transverse passage, a second tubular member that extends outwardly from said valve body and communicates with a downwardly extending passage therein;

b. a cylindrical valve member rotatably and sealingly supported in said bore, said valve member having a second transverse passage therein that lies in the same plane as said first passage, said second passage in communication with a downward passage in said valve member, and a circular recess in said bottom surface;

c. a base that includes a top surface and a bottom surface, said top surface having a circular recess therein, a third tubular member that extends outwardly from said base;

d. first and second resilient rings mounted in said first and second recesses;

e. a cylindrical transparent shell that has first and second end portions disposed in said first and second recesses;

f. a U-shaped supporting clip that has first and second legs that engage said top and bottom surfaces of said valve body and base and force said cylindrical shell into pressure sealing contact with first and second resilient rings, said valve body cylindrical shell and base cooperating to define a confined space;

g. first, second and third tubes connected to said first, second and third tubular members, said first tube connected to a source of water, said second tube to said distributor, and said third tube to said passage in said carburetor, with said engine when operating creating a vacuum in said confined space to draw water into said confined space drop by drop, and the rate at which said drops enter said confined space dependent on the positioning of said second transverse passage relative to said first transverse passage, and said drops flowing through said third tube to said intake manifold to be subsequently vaporized in the cylinders of said engine to augment the pressure to which the pistons therein are subjected.

* * * * *